(12) United States Patent
Smith et al.

(10) Patent No.: US 7,170,595 B2
(45) Date of Patent: Jan. 30, 2007

(54) OPTICAL SLIT

(75) Inventors: Brian John Edward Smith, Bristol (GB); Andrew Mark Woolfrey, Wotton-under-Edge (GB)

(73) Assignee: Renishaw, PLC, Gloucestershire (GB)

( * ) Notice: Subject to any disclaimer, the term of this patent is extended or adjusted under 35 U.S.C. 154(b) by 429 days.

(21) Appl. No.: 10/474,182

(22) PCT Filed: Apr. 8, 2002

(86) PCT No.: PCT/GB02/01507

§ 371 (c)(1),
(2), (4) Date: Oct. 6, 2003

(87) PCT Pub. No.: WO02/082025

PCT Pub. Date: Oct. 17, 2002

(65) Prior Publication Data

US 2004/0150817 A1 Aug. 5, 2004

(30) Foreign Application Priority Data

Apr. 6, 2001 (GB) .................................. 0108698.0
Jul. 24, 2001 (GB) .................................. 0117948.2

(51) Int. Cl.
*G01J 3/04* (2006.01)

(52) U.S. Cl. ........................ 356/300; 356/332; 359/232

(58) Field of Classification Search ........ 356/333–334, 356/300, 305, 326, 328; 359/232
See application file for complete search history.

(56) References Cited

U.S. PATENT DOCUMENTS

| | | | |
|---|---|---|---|
| 4,082,461 A | * | 4/1978 | Mould ........................ 356/332 |
| 4,325,634 A | | 4/1982 | Tohyama |
| 4,612,440 A | | 9/1986 | Brunnee et al. |
| 5,206,765 A | * | 4/1993 | Trager ........................ 359/894 |
| 5,508,838 A | * | 4/1996 | Shimizu et al. ............. 359/232 |
| 5,661,589 A | * | 8/1997 | Meyer ........................ 359/232 |
| 6,252,696 B1 | * | 6/2001 | Koschmieder et al. ...... 359/232 |
| 6,765,707 B2 | * | 7/2004 | Ishikawa et al. ............ 359/232 |
| 6,956,688 B2 | * | 10/2005 | Hoshino ..................... 359/232 |

FOREIGN PATENT DOCUMENTS

| | | |
|---|---|---|
| EP | 0 543 578 B1 | 6/1995 |
| EP | 0 542 962 B2 | 3/2002 |
| JP | A 57-7523 | 1/1982 |
| JP | A 1-86027 | 3/1989 |
| WO | WO 02/075292 A2 | 9/2002 |

* cited by examiner

*Primary Examiner*—Layla G. Lauchman
(74) *Attorney, Agent, or Firm*—Oliff & Berridge, PLC

(57) ABSTRACT

An optical slit comprises two blades 40,42 which define a slit between them, each blade being independently movable. This enables both the slit position and the slit width to be adjusted. The slit may be aligned with the center of a light beam by aiming the light beam at a detector, traversing at least one edge of the slit across the beam path, measuring the intensity of transmitted light at the detector for each position of the slit, and feeding back a signal which adjusts the slit position for maximum light throughput. The width on the optical slit may be selected by placing the slit in the path of the light beam and measuring the light transmitted at the detector, calculating the percentage of light transmitted for that slit width and feeding back a signal which adjusts slit width to obtain the desired amount of light throughput.

26 Claims, 9 Drawing Sheets

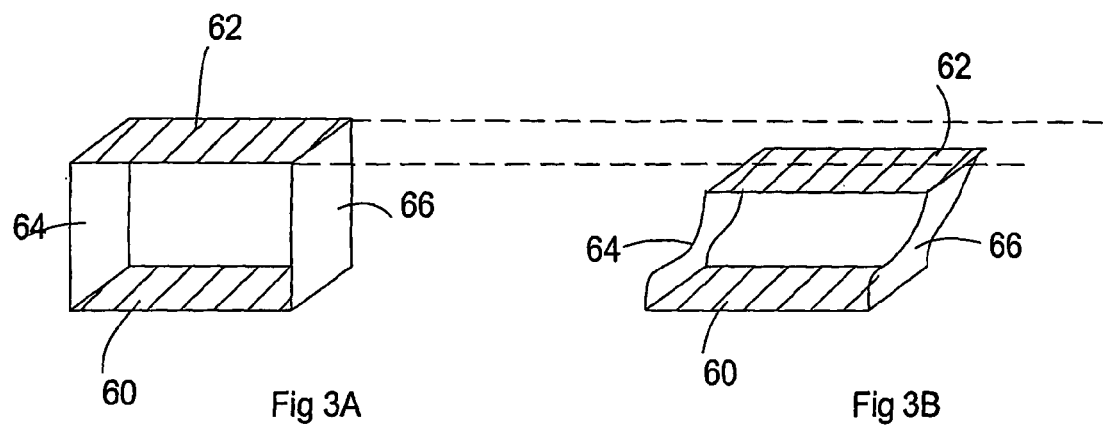
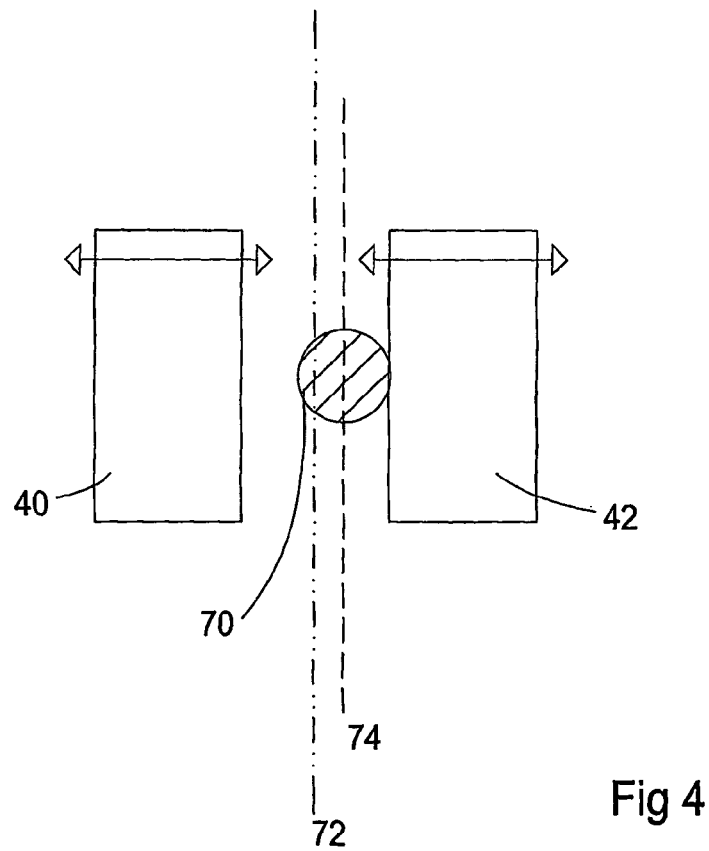

OPTICAL SLIT

This invention relates to an optical slit, for example for use in a spectroscopy system.

In our earlier European Patent Specification EP 0543578, a sample is irradiated with monochromatic light from a laser and scattered light is analysed in order to select a particular line of the resulting Raman spectrum. The analysis may be performed by a dispersive device such as a diffractive grating or it may be performed using a non-dispersive tunable filter. The resulting Raman scattered light may be focused onto a charge-coupled device (CCD) which is a two-dimensional photodetector array.

European Patent No. 0542962 discloses a method of spectroscopy as above in which one-dimensional confocality is achieved by use of a spatial filter comprising an optical slit.

A first aspect of the invention provides an optical slit device comprising two blades defining a slit between them wherein each blade may move independently of the other.

Preferably the blades are motorised.

A second aspect of the invention provides a method for aligning an optical slit with the centre of a light beam in a spectroscopy system comprises:

aiming the light beam at a detector;
traversing at least one edge of an optical slit across the beam path;
detecting the intensity of transmitted light at the detector at a plurality of positions of the at least one edge of the optical slit;
and feeding back a signal which adjusts the slit position.

A third aspect of the invention provides a method for setting the width on an optical slit in a spectroscopy system comprises:

aiming a light beam at a detector;
placing the slit in the path of the light beam;
detecting the intensity of transmitted light at the detector for that slit width;
calculating the ratio of transmitted light for that slit width compared to the amount of transmitted light with no slit;
and feeding back a signal which adjusts slit width to obtain the desired amount of light throughput.

Figure 1:
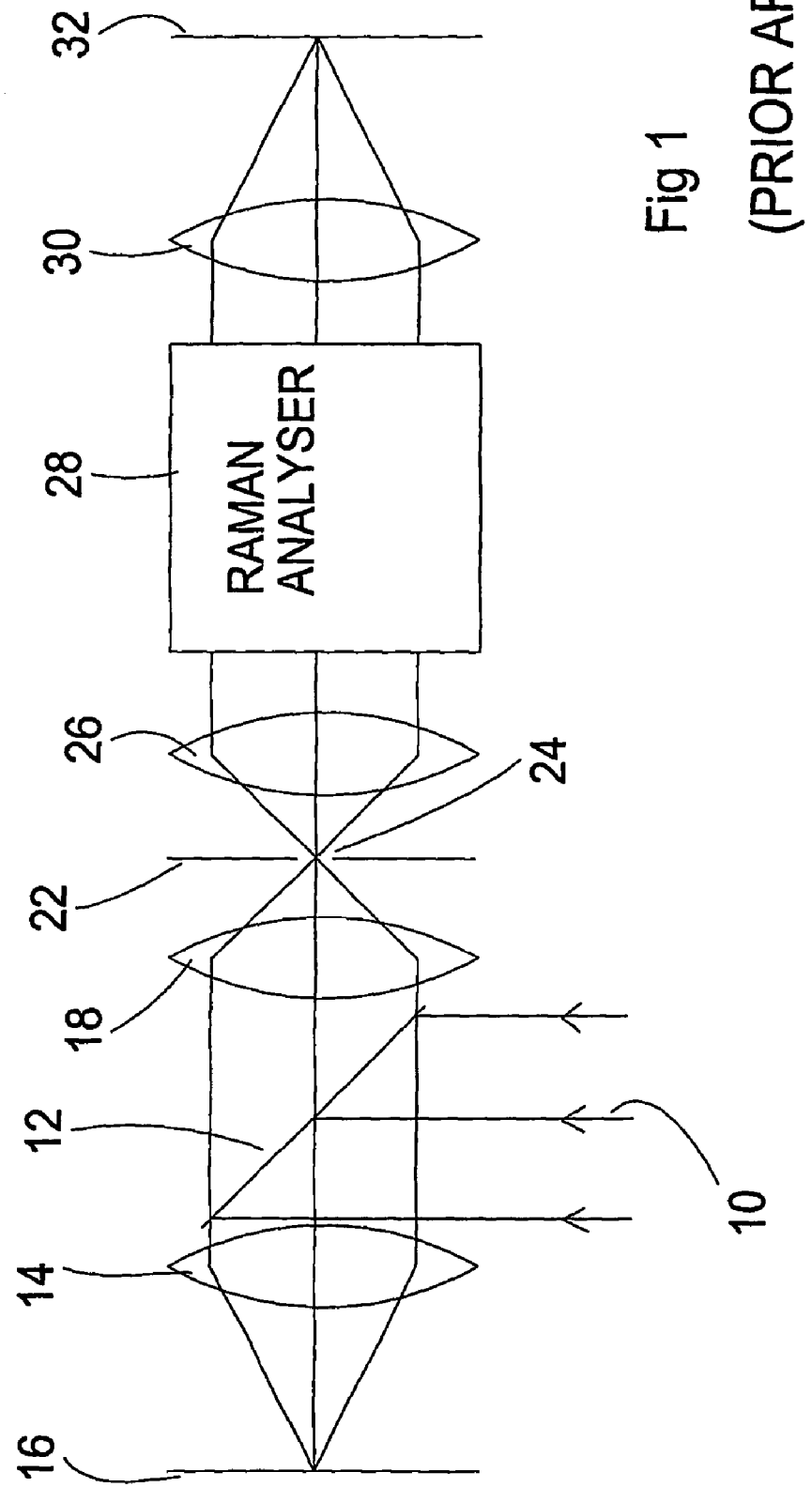
Figure 2:
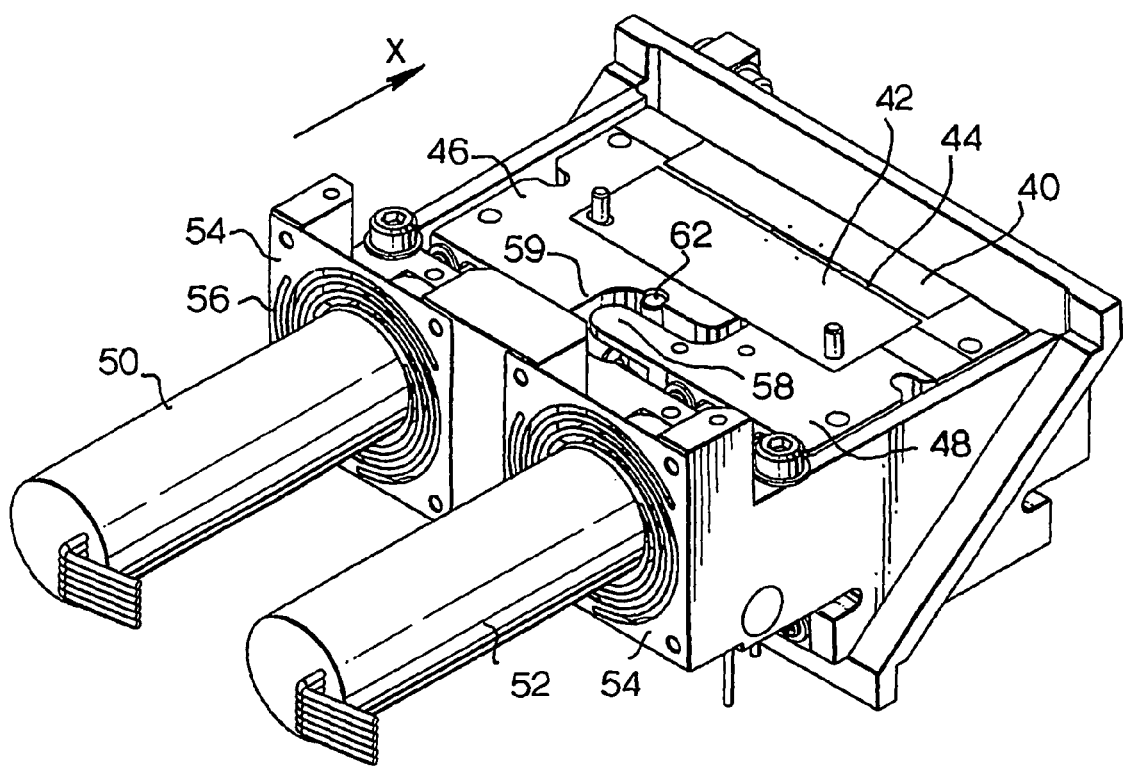
Figure 5:
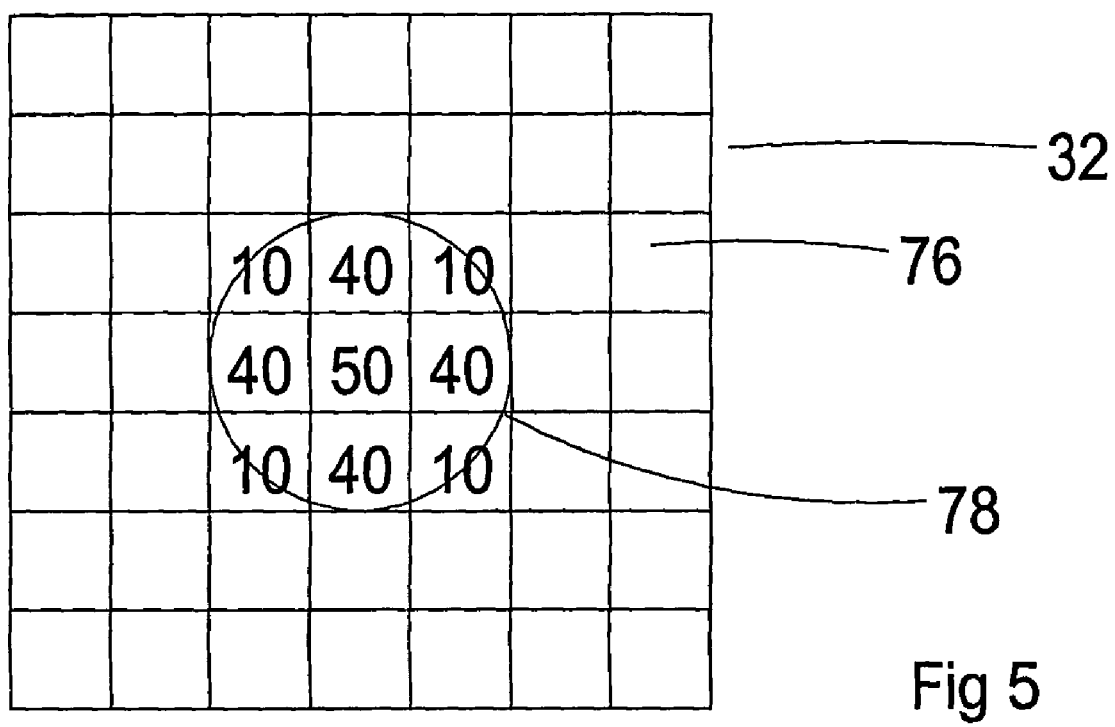
Figure 6:
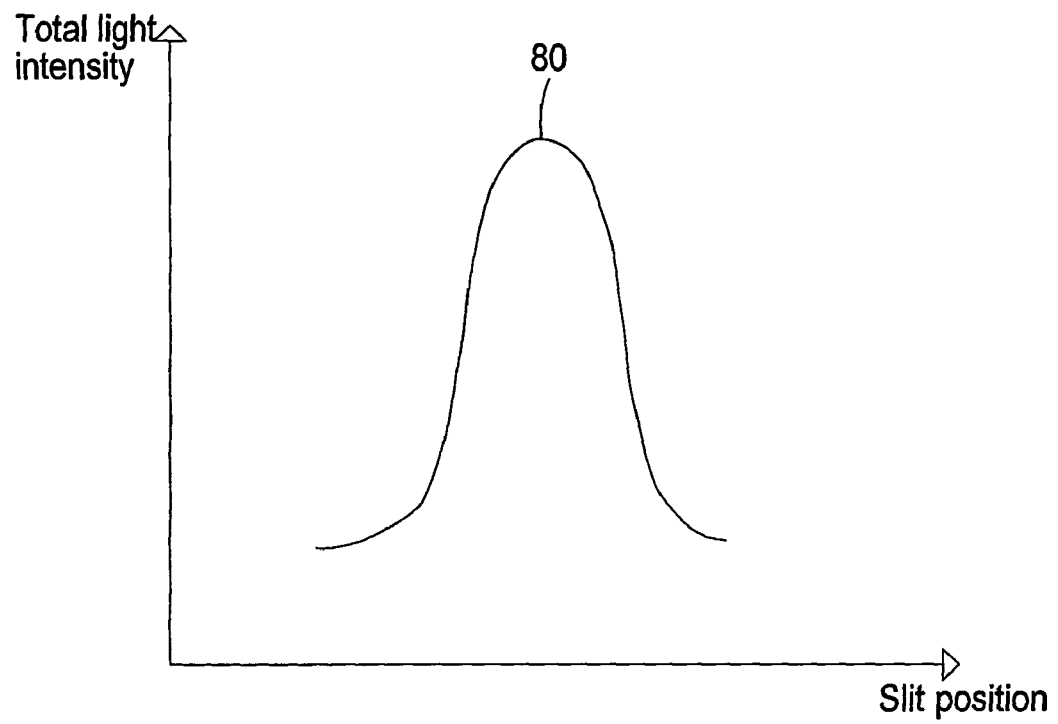
Figure 7:
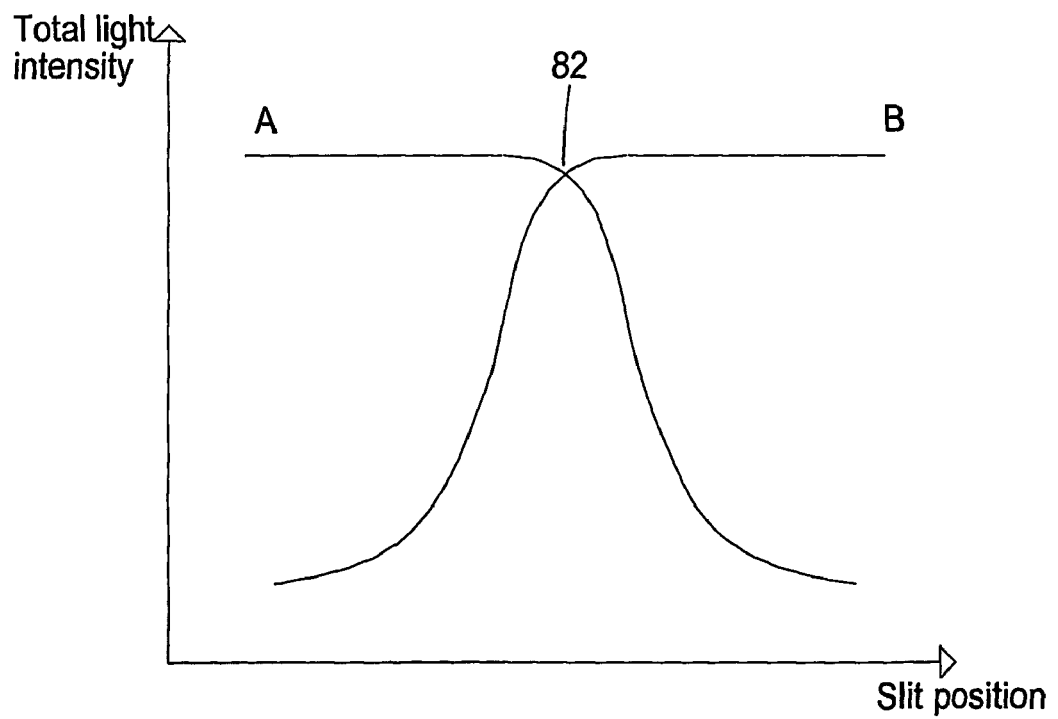
Figure 8:
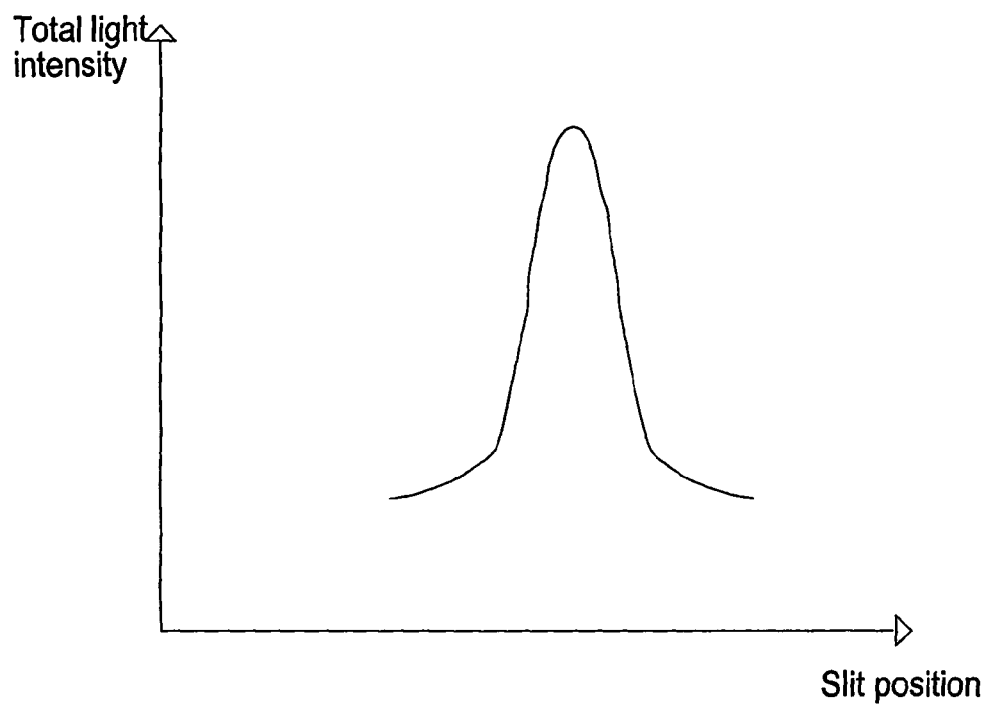
Figure 9:
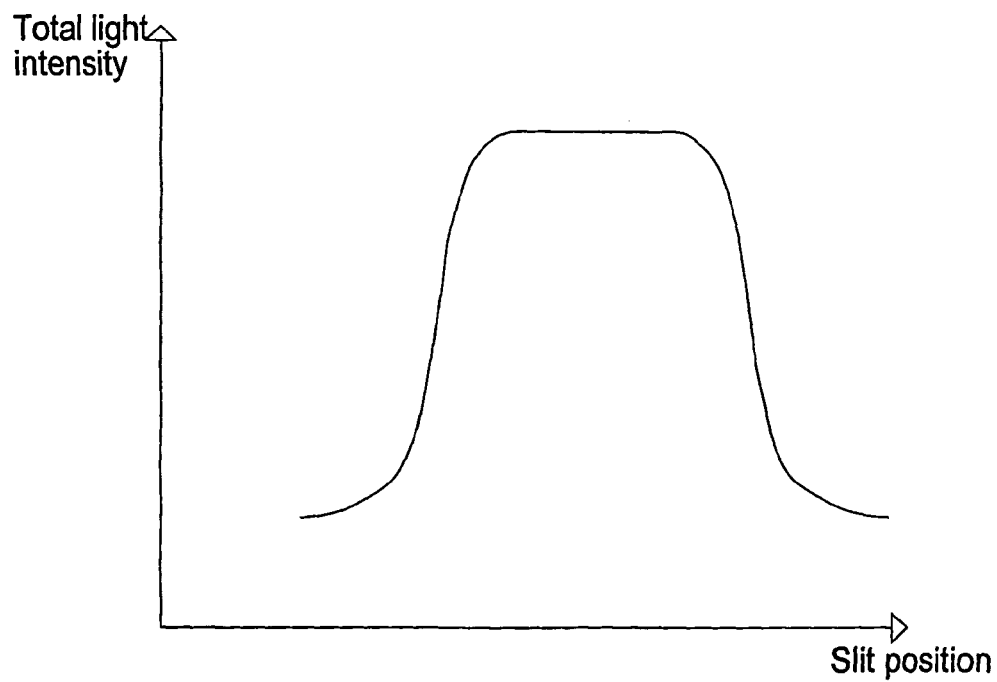
Figure 10:
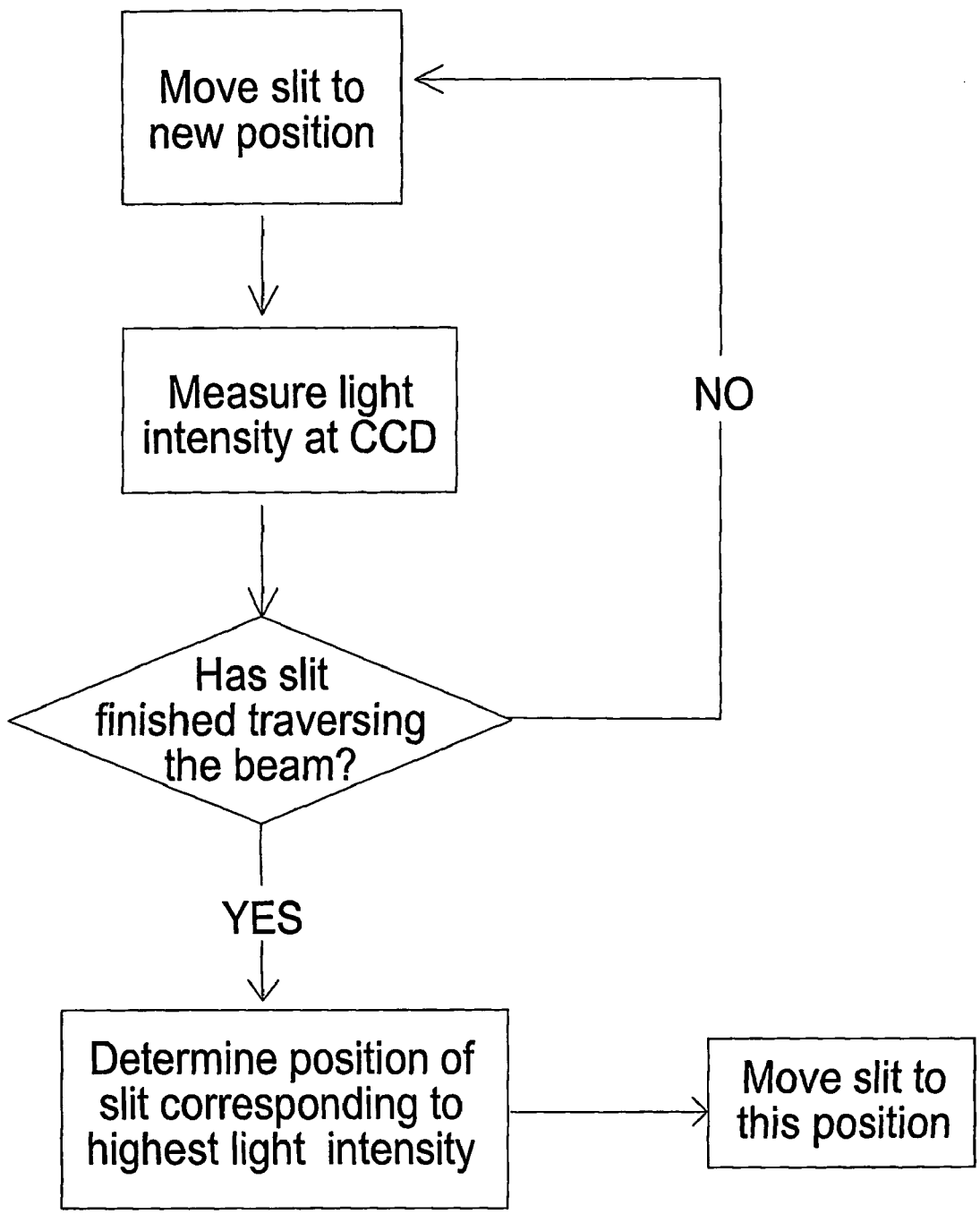
Figure 11:
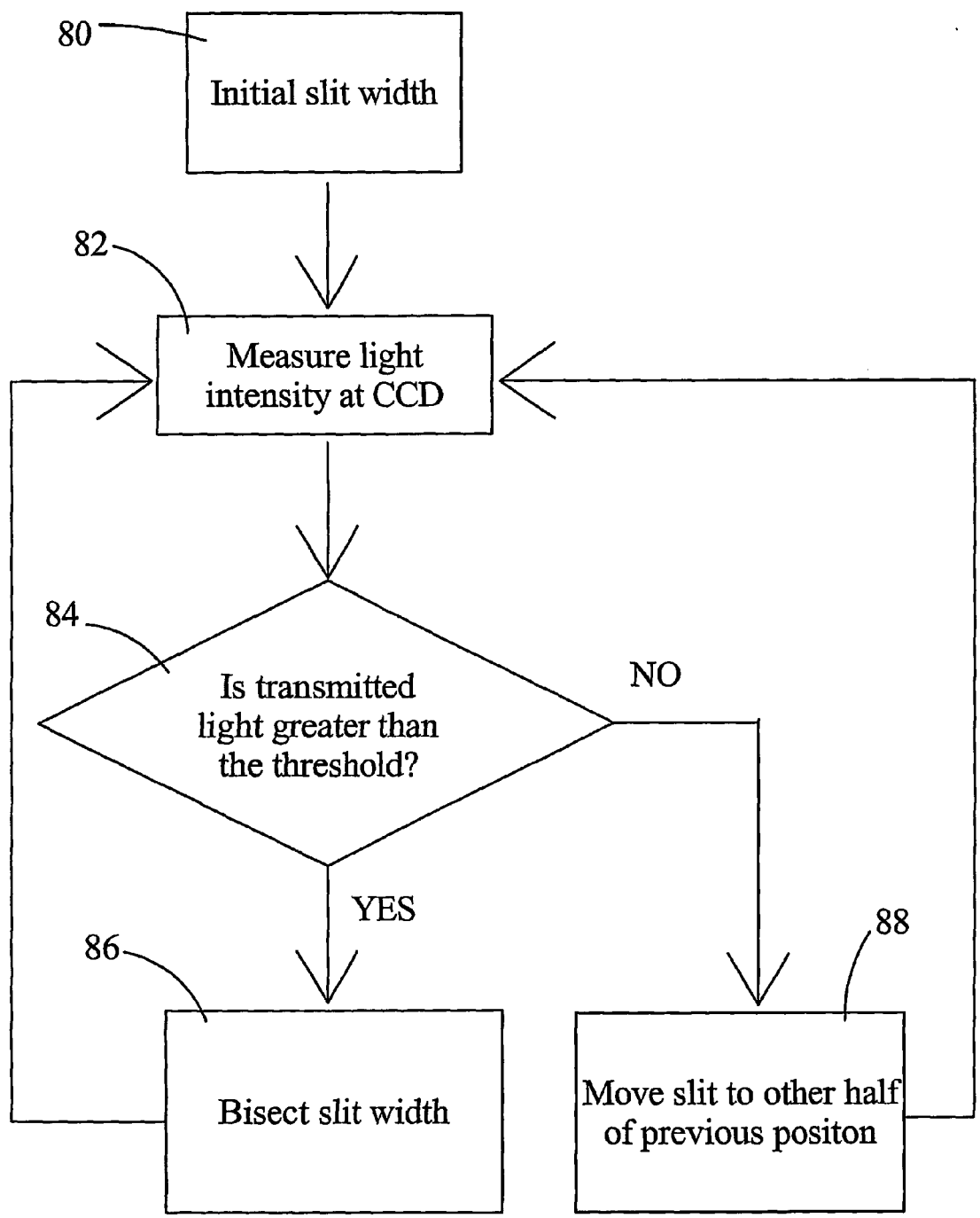
Figure 12:
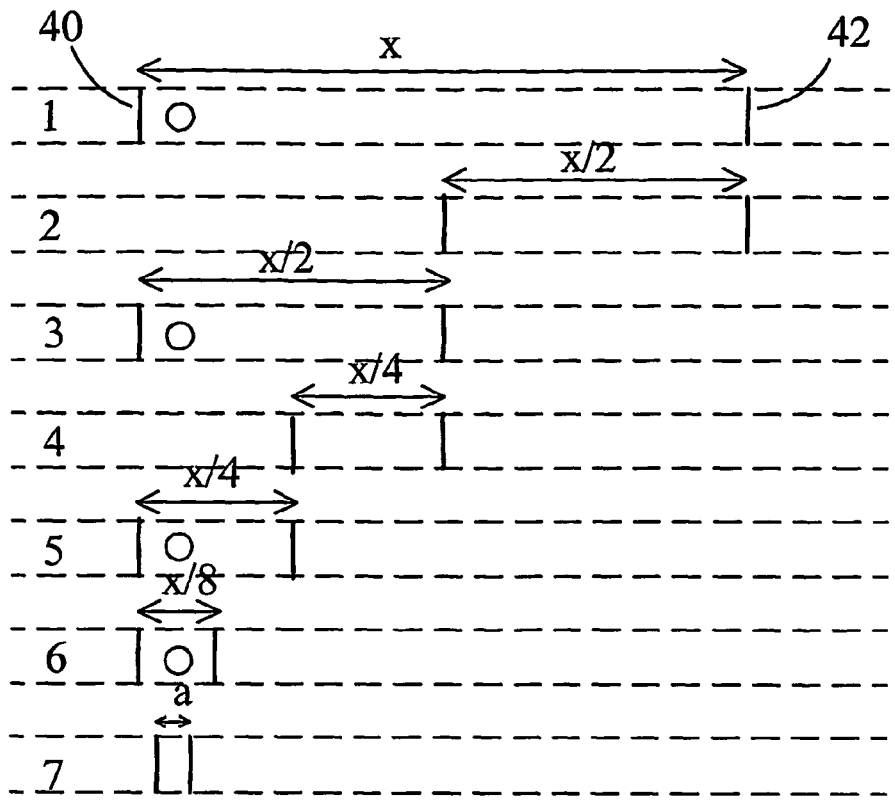
Figure 13:
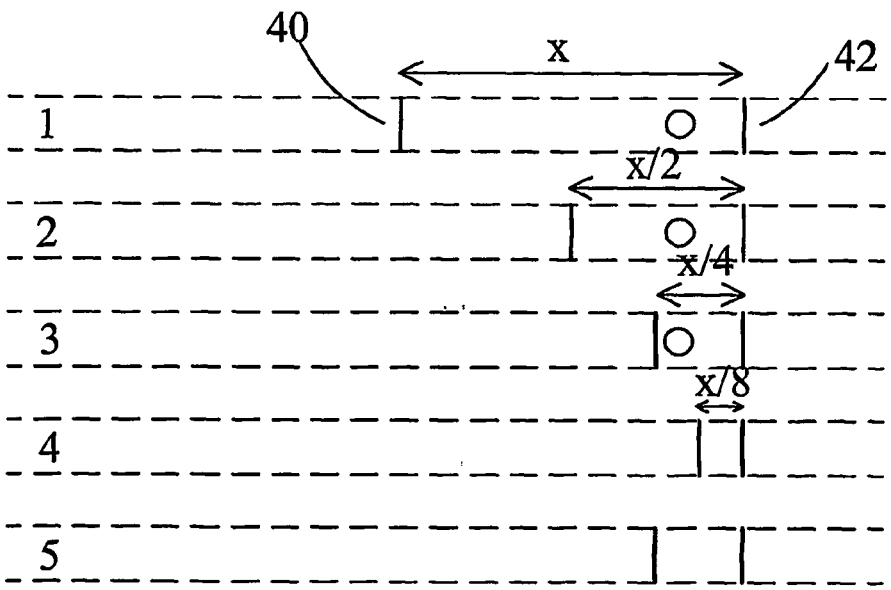

Preferred embodiments of the invention will now be described by way of example, with reference to the accompanying drawings wherein:

FIG. 1 is a schematic diagram of a prior Raman system;
FIG. 2 is an isometric view of the spatial filter;
FIGS. 3A and 3B are side views of flexure units used in FIG. 2;
FIG. 4 is a plan view of an optical slit and light beam;
FIG. 5 shows a typical image intensity profile on a CCD;
FIG. 6 shows a typical plot of light intensity at the CCD as two edges of a slit are traversed together;
FIG. 7 shows a typical plot of light intensity at the CCD as two edges of the slits are traversed independently;
FIG. 8 shows a plot of light intensity at the CCD as the slit is traversed across a light beam when the slit width is less than the beam diameter;
FIG. 9 shows a plot of light intensity at the CCD as the slit is traversed across a light beam when the slit width is greater than the beam diameter;
FIG. 10 shows a block diagram of the method of finding the beam centre;
FIG. 11 shows a block diagram of an alternative method of finding the beam centre;
FIG. 12 illustrates the method of FIG. 11 in which both blades defining the slit are moved; and
FIG. 13 illustrates the method of FIG. 11 in which only one of the two blades defining the slit is moved.

Referring to the drawings, the previously known arrangement shown in FIG. 1 has a dichroic filter 12 arranged at 45° to an incoming laser beam 10. It could instead be arranged at a low angle to the beam, as explained in EP 0543578. The incoming beam is reflected by the dichroic filter 12 and then focused by an objective lens 14 onto a point on the sample 16. Light scattered from the point on the sample is collected by the objective lens 14, collimated into a parallel beam and passed through the dichroic filter 12. The dichroic filter 12 rejects the Rayleigh scattered light having the same frequency as the input beam but transmits the Raman scattered light. The Raman scattered light is brought to a tight focus by a lens 18 at a spatial filter comprising a screen 22 with a slit 24. Light scattered from the focal point of the objective lens passes through the slit 24. Most of the light scattered from behind or in front of the focal point is blocked by the screen 22 as it does not come to a focus at the slit. Thus the slit confers one-dimensional confocality to the scattered light. Light passing through the slit is collimated by a lens 26 to a parallel beam and passes through the Raman analyser 28. The analyser may produce a spectrum (i.e. when a diffraction grating is used) or select light from just one frequency (e.g. by using a tunable non-dispersive filter). A lens 30 brings the analysed light to a tight focus on the photodetector 32 which may be a charge-coupled device (CCD).

In our co-pending International application WO 02/075292 filed 26$^{th}$ Sep. 2003 the slit 22 is required to move from side to side to enable scanning of the sample. An adjustable slit width would allow the slit to be adjusted between confocal and non-confocal settings.

A preferred embodiment of the spatial filter is shown in FIG. 2 in which two movable blades 40,42 define a slit between them. Each blade 40,42 is mounted on an anvil 46,48 which in turn is mounted on a flexure unit shown in FIG. 3. Each flexure unit shown in FIG. 3A, comprises two spaced-apart parallel plates 60,62 one above the other, connected by two planar springs 64,66 which join opposite edges of the upper plate 62 to opposite edges of the lower plate 60 to form a box shape. This arrangement allows the upper plate 62 and thus the anvil 46,48 to move in a first horizontal direction relative to the lower plate as seen in FIG. 3B (i.e. in the direction of opening and closing the slit, parallel to arrow X in FIG. 2), whilst the upper and lower plates remain parallel. Movement of the upper plate in a second direction perpendicular to the first direction is constrained.

The movement of each anvil is controlled by a motor 50,52. Each motor is mounted in the centre of a planar spring 54. Each spring has cut-outs 56 which allow movement of the motor parallel to the motor axis, yet constrains any rotational movement about this axis. The spring also allows some lateral movement and tilting to overcome any small alignment errors of the motors.

As the upper plate 62 of the flexure unit moves from side to side its distance relative to the lower plate 60 will vary due to the bending of the planar springs 64,66 connecting them, seen in FIGS. 3A and 3B. This variation causes the distances between the slit 24 and the sample 16 and between the slit 24 and the photodetector 32 to change with different slit positions. Therefore it is necessary to include an error adjustment in the analysed data dependent upon slit position.

The two blades 40,42 may either move together or independently. To move together one motor is used to move one of the anvils in the desired direction, this anvil will push the other one along with the slit width remaining constant, i.e. at its minimum width. For example, motor 52 is used to move anvil 48 in direction X. Anvils 48 and 46 have interlocking shapes such that protruding portion 58 of anvil 48 pushes against a recess portion 59 of anvil 46, resulting in anvil 48 pushing anvil 46. A spacer element 62 is provided on the recess portion 59 of anvil 46 adjacent the protruding portion 58 of anvil 46. This spacer element 62 ensures the anvils 46 and 48 are a constant distance apart during this operation and thus the slit width is constant at its minimum width.

Alternatively both motors may be used to move the two anvils and thus the two blades independently. This permits both the width and the position of the slit to be varied.

This arrangement is also suitable for use in aligning the slit with a light beam in a spectrometer. Confocal and small laser spot requirements for Raman microscopy require very fine adjustment of the alignment of the laser beam onto a traditional spectrometer slit. Alignment of the laser onto the slit is subject to long-term stability problems and generally needs to be adjusted. Use of the motorised slits described in the above embodiment enables the position of the centre of the opening of the slit to be varied.

FIG. 4 shows two blades 40,42 defining a slit and a beam 70 in a spectrometer. It is desirable for the position of the centre of the opening 72 of the optical slit to correspond with the beam centre 74 of the laser. Thus the beam position must be calculated in order to adjust the centre of opening position accordingly.

In a first method the slit width between blades 40,42 is kept fixed, for example at 50 μm and the slit is traversed across the beam path. The traversal of the slit may be step-wise or continuous. During this manoeuvre, the intensity of the transmitted light is measured at the CCD for each position of the slit.

FIG. 5 shows a small portion of the CCD 32 comprising a two-dimensional array of pixels 76. The values shown on the CCD correspond to the light intensity of the image at each pixel. These values will differ for each slit position.

The total value of the light intensity measured at the CCD for each slit position is plotted and curve fitted on a graph shown in FIG. 8. The highest value of the total intensity 80 corresponds to the position of the beam centre (i.e. when the position of the centre of the opening of the optical slit was aligned with the beam centre). Feedback from the detector is used to drive the blades to their calculated positions, derived from the light intensity measurements at the detector. The slit has thus now been moved to a position aligned with the beam centre.

This method is shown in summary in FIG. 10.

In a second method of determining the centre beam position 74, each blade 40,42 of the slit is traversed independently across the beam 70. As in the previous method the total intensity of transmitted light is measured for each slit position. Firstly blade 40 is moved across the beam to produce curve A seen in FIG. 9, then blade 42 is traversed across the beam to produce curve B. The data from both these measurements are combined to determine the position of the beam centre 82. The slit may then be moved so that the position of the centre of the opening of the slit 72 is aligned with the beam centre 74.

In an alternative method of determining the beam centre, the blades may be moved together or separately in bisections to reduce the number of measurements required, thus reducing the uncertainty by a factor of two for each step.

The slit is placed between the light source and the photodetector and the total value for the light intensity at the photodetector is measured for each position of the blades. The slit is set at an initial width 80 and the total light intensity at the photodetector is measured 82. It is determined whether the light transmitted to the photodetector for this slit position is over a certain threshold 84, for example 50%. If the transmitted light is over the threshold, the slit width is bisected 86. If the transmitted light is under the threshold, the slit is moved to the other half of the previous position 88. This process is repeated, each time halving the slit width until the centre of the beam is found. The slit is then positioned at the centre of the beam.

FIG. 12 illustrates this method in which both blades defining the optical slit are moved together. In step 2, the blades 40,42 are a distance x apart. The detected light intensity is greater than 50% and so the slit width is bisected to x/2, as shown in step 2. In step 2 the detected light intensity is less than 50% so the slit width remains the same but the slit position is moved to the other half of the previous position as shown in step 3. In step 3 the detected light intensity is over 50% so the slit width is bisected to x/4 as shown in step 4. In step 4 the detected light intensity is less than 50% and so the slit width remains at x/4 but the position is moved to the other half of the previous position as shown in step 5. In step 6 the detected light intensity is greater than 50% and so the slit width is bisected. Once the minimum slit width, a, has been reached as in step 7, the slit is aligned with the centre of the beam.

Thus the slit width is halved on every step, or every other step. The highest possible number of steps to find the centre is two times the power of two from maximum to minimum slit width.

FIG. 13 illustrates the method in which one blade 42 remains stationary whilst the other blade 40 moves to vary the slit position. Each time the detected light intensity is greater than 50%, the blade 40 is moved towards the blade 42 by half the current slit width as shown in steps 1–3. If the light intensity is less than 50%, the blade 40 is moved away from the blade 42 by half the current slit width as shown in step 5. The centre of the beam is thus found and the minimum step size of the slit is reached. In this method the step size is halved every step and the maximum number of steps to find the beam centre is thus the power of two from maximum to minimum slit width.

This method has the advantage that it is faster than the previously described methods in which the beam centre is found by traversing the slit across the beam. For example a 1 μm slit may be aligned with the centre of the 2 mm beam in just 11 steps by this method.

The motorised slit arrangement described above also enables the slit width to be varied. This is useful for adjusting between confocal and non-confocal settings. The width of the slit is indicated by the percentage of light transmitted to the CCD. For example a confocal setting may give 80% light transmission whilst a non-confocal setting may give 98% transmission. A desired slit width may therefore be set by adjusting the width of the slit until the corresponding percentage of light is transmitted to the CCD. The effect of different slit widths can be seen in FIGS. 8 and 9. Both Figures are plots of total light intensity measured at the CCD for different slit positions (as in FIG. 6). FIG. 8 is the case where slit width is less than the beam diameter (i.e.

confocal) and FIG. 9 is the case where slit width is larger than the beam diameter (i.e. non-confocal).

The motorised slit arrangement is not restricted to the use described above and is suitable for various other uses, for example shaping beams, imaging, beam aperturing, beam profiling, measurements and resolution.

Furthermore the motorised slit arrangement is suitable for use in a variety of optical systems, for example spectrographs, monochromators, Fourier filtering and modulation transfer functions.

The invention claimed is:

1. An optical slit device comprising two blades defining a slit between them wherein each blade is movable independently of the other and wherein a spacer is provided to keep the blades at a minimum width.

2. An optical slit device according to claim 1 wherein the blades are motorised.

3. An optical slit device according to claim 1 wherein the two blades are each mounted on a flexure unit.

4. An optical slit device according to claim 2 wherein the motor driving each blade is mounted on a spring to allow movement parallel to the axis of the motor yet constrains rotational movement about said axis.

5. An optical slit device according to claim 1 wherein when the slit is positioned between a sample and a photodetector, the slit is at a different distance from the photodetector and sample for each slit position and wherein an error adjustment is included in analysed data from the photodetector for different slit positions to correct for these different distances.

6. An optical slit device according to claim 1 wherein the blades are moveable together.

7. An optical slit device according to claim 6 wherein a motor is used to move one of the blades which in turn pushes the other blade.

8. An optical slit device according to claim 2 wherein:
a controller is provided to drive the movement of at least one blade;
such that when the optical slit device is positioned in a beam path between a light source and a detector, the controller is operable to drive at least one of the blades across the beam path, such that the intensity of transmitted light at the detector is detected for a plurality of positions of the at least one blade;
and wherein the controller feeds back a signal from the detector to adjust the position of the at least one blade.

9. An optical slit device according to claim 7 wherein the controller drives both blades across the beam path together, at a constant distance apart.

10. An optical slit device according to claim 8 wherein:
the controller drives a first blade of the two blades across the beam path whilst the intensity of transmitted light at the detector is detected for each position of the first blade;
the controller drives a second blade of the two blades across the beam path whilst the intensity of transmitted light at the detector is detected for each position of the second blade;
and wherein the controller combines the data from these two steps.

11. An optical slit device according to claim 8 wherein:
the controller determines whether the intensity of transmitted light is above a threshold for each position of the at least one blade;
such that if the intensity of the transmitted light is above the threshold, the controller moves the at least one blade in order to sub-divide the slit width.

12. An optical slit device according to claim 11 wherein:
the controller drives both blades across the beam;
such that if the intensity of transmitted light is above the threshold, the controller drives the blades in order to sub-divide the slit width and wherein if the intensity of the transmitted light is below the threshold, the controller drives the blades in order to move the slit within its previous position whilst the slit width remains the same.

13. An optical slit device according to claim 8 wherein:
the controller drives a first blade of the two blades across the beam whilst the second blade of the two blades remains stationary;
such that if the intensity of the transmitted light is above a threshold, the controller drives the first blade in order to position it towards the second blade, and wherein if the intensity of the transmitted light is below the threshold, the controller drives the first blade away from the second blade to increase the slit width.

14. An optical slit device according to claim 11, wherein the slit is sub-divided into substantially half its previous width.

15. An optical slit device according to claim 11, wherein the threshold is substantially 50% of the intensity of transmitted light with the optical slit removed.

16. An optical slit device according to claim 2 wherein:
a controller is provided to drive the movement of at least one blade;
such that when the optical slit device is positioned in a beam path between a light source and a detector, the ratio of transmitted light for that slit width compared to the amount of transmitted light with no slit is calculated;
and wherein a signal is fed back to the controller to move the at least one blade to adjust the slit width to obtain the desired amount of light throughput.

17. A method for aligning an optical slit with the center of a light beam in a spectroscopy system comprises:
aiming the light beam at a detector;
traversing at least one edge of an optical slit across the beam path;
detecting the intensity of transmitted light at the detector at a plurality of positions of the at least one edge of the optical slit;
and feeding back a signal which adjusts the slit position.

18. A method for aligning an optical slit according to claim 17 wherein the slit position is adjusted for maximum light throughput at a given slit width.

19. A method for aligning an optical slit according to claim 17 wherein two edges of the optical slit are traversed across the beam path together with the edges at a constant distant apart.

20. A method for aligning an optical slit according to claim 17 wherein:
a first edge of an optical slit is traversed across the beam path and the intensity of transmitted light at the detector is detected for each position of the first edge of the optical slit;
a second edge of an optical slit is traversed across the beam path and the intensity of transmitted light at the detector is detected for each position of the second edge of the optical slit;
and wherein the data from these measurements are combined.

21. A method for aligning an optical slit according to claim 17 wherein:

it is determined whether the intensity of transmitted light is above a threshold for each position of the at least one edge of the optical slit;

such that if the intensity of the transmitted light is above the threshold, the at least one edge of the optical slit is moved in order to sub-divide the slit width.

22. A method for aligning an optical slit according to claim 21 wherein:

both edges of the optical slit are traversed across the beam;

such that if the intensity of the transmitted light is above the threshold, the edges of the optical slit are moved in order to sub-divide the slit width and wherein if the intensity of the transmitted light is below the threshold, the edges of the optical slit are moved in order that position of the slit is moved within the previous position whilst the slit width remains the same.

23. A method of aligning an optical slit according to claim 21 wherein:

a first edge of the optical slit is traversed across the beam whilst the second edge remains stationary;

such that if the intensity of the transmitted light is above the threshold, the first edge of the optical slit is moved in order to position it closer to the second edge, and wherein if the intensity of the transmitted light is below the threshold, the first edge is moved to position it further away from the second edge to increase the slit width.

24. A method of aligning an optical slit according to claim 21 wherein the slit is sub-divided into substantially half its previous width.

25. A method of aligning an optical slit according to claim 21 wherein the threshold is substantially 50% of the intensity of transmitted light with the optical slit removed.

26. A method for setting the width on an optical slit in a spectroscopy system comprises:

aiming a light beam at a detector;

placing the slit in the path of the light beam;

detecting the intensity of transmitted light at the detector for that slit width;

calculating the ratio of transmitted light for that slit width compared to the amount of transmitted light with no slit;

and feeding back a signal which adjusts slit width to obtain the desired amount of light throughput.

* * * * *